(12) United States Patent
Hsu et al.

(10) Patent No.: US 10,768,673 B2
(45) Date of Patent: Sep. 8, 2020

(54) PORTABLE ELECTRONIC DEVICE

(71) Applicants: Wei-Chih Hsu, Taipei (TW); Ya-Hui Tseng, Taipei (TW); Chang-Kai Liu, Taipei (TW); Ming-Shun Lu, Taipei (TW); Wen-Jie Hsiao, Taipei (TW)

(72) Inventors: Wei-Chih Hsu, Taipei (TW); Ya-Hui Tseng, Taipei (TW); Chang-Kai Liu, Taipei (TW); Ming-Shun Lu, Taipei (TW); Wen-Jie Hsiao, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/687,642

(22) Filed: Nov. 18, 2019

(65) Prior Publication Data

US 2020/0081503 A1    Mar. 12, 2020

Related U.S. Application Data

(62) Division of application No. 15/491,953, filed on Apr. 19, 2017, now Pat. No. 10,520,986.

(60) Provisional application No. 62/326,847, filed on Apr. 25, 2016.

(51) Int. Cl.
G06F 1/16 (2006.01)

(52) U.S. Cl.
CPC .......... *G06F 1/1681* (2013.01); *G06F 1/1616* (2013.01); *G06F 1/1643* (2013.01); *G06F 1/162* (2013.01)

(58) Field of Classification Search
CPC ........................................................ G06F 1/16
See application file for complete search history.

(56) References Cited

U.S. PATENT DOCUMENTS

2009/0007380 A1*  1/2009  Feng ................... H04M 1/0216
                                                                16/305

* cited by examiner

*Primary Examiner* — Jerry Wu
(74) *Attorney, Agent, or Firm* — JCIPRNET

(57) ABSTRACT

A hinge structure including a first screw rod, a sliding rod, and a second screw rod is provided. The first screw rod comprises a threaded shaft. The sliding rod is sleeved on the threaded shaft. The second screw rod is sleeved on the sliding rod. The threaded shaft has a first helical slot. The sliding rod has a first guiding portion and a second guiding portion, and the first guiding portion is coupled to the first helical slot. The second screw rod has a second helical slot, and the second guiding portion is coupled to the second helical slot.

11 Claims, 12 Drawing Sheets

PORTABLE ELECTRONIC DEVICE

CROSS-REFERENCE TO RELATED APPLICATION

This application is a divisional application of and claims the priority benefit of U.S. application Ser. No. 15/491,953, filed on Apr. 19, 2017, now allowed, which claims the priority benefit of U.S. provisional application Ser. No. 62/326,847, filed on Apr. 25, 2016. The entirety of each of the above-mentioned patent applications is hereby incorporated by reference herein and made a part of this specification.

FIELD OF THE INVENTION

The invention relates to a hinge structure and a portable electronic device. More particularly, the invention relates to a hinge structure and a portable electronic device using the hinge structure.

DESCRIPTION OF RELATED ART

A biaxial pivot structure is adopted most of the time by general notebook computers to connect the hosts and the display screens. The hosts and the display screens may rotate relative to each other through the biaxial pivot structure, such that the hosts and the display screens may be overturned by 360 degrees. Nevertheless, the biaxial pivot structure occupies much space in the notebook computers, and the notebook computers are prevented from bringing thin and lightweight design as a result. On the other hand, in the present market, the lenses of the notebook computers are disposed mostly at the side away from the display screens.

SUMMARY OF THE INVENTION

The invention provides a hinge structure and a portable electronic device for reducing the size of overall structure to satisfy the requirement for thin and lightweight design of the products as well as enhancing operating convenience for a user.

A hinge structure including a first screw rod, a sliding rod, and a second screw rod is provided by the embodiments of the invention. The first screw rod comprises a threaded shaft. The sliding rod is sleeved on the threaded shaft. The second screw rod is sleeved on the sliding rod. The threaded shaft has a first helical slot. The sliding rod has a first guiding portion and a second guiding portion opposite to each other, and the first guiding portion is coupled to the first helical slot. The second screw rod has a second helical slot, and the second guiding portion is coupled to the second helical slot.

In an embodiment of the invention, a helical direction of the helical slot and a helical direction of the second helical slot are opposite.

In an embodiment of the invention, a helical angle of the first helical slot is greater than a helical angle of the second helical slot.

In an embodiment of the invention, a helical length of the first helical slot is greater than a helical length of the second helical slot.

In an embodiment of the invention, in the hinge structure, when the first screw rod rotates along a first rotating direction, the first guiding portion is driven by the first helical slot, such that the sliding rod drives the second helical slot through the second guiding portion, and that the second screw rod rotates along a second rotating direction different from the first rotating direction.

In an embodiment of the invention, a passive module is further included in the hinge structure and is rotatably connected to the second screw rod, and the passive module has a lens.

In an embodiment of the invention, the second screw rod is located between the first screw rod and the passive module.

In an embodiment of the invention, the second screw rod is magnetically attracted to the passive module.

In an embodiment of the invention, the hinge structure further includes a limiting member, and the limiting member includes a first limiting portion, a second limiting portion, and a third limiting portion. The second limiting portion is located between the first limiting portion and the third limiting portion, and the threaded shaft penetrates through the first limiting portion. The sliding rod may be slidably disposed between the first limiting portion and the third limiting portion and penetrates through the second limiting portion.

In an embodiment of the invention, the second screw rod includes a body, and the second helical slot is located on the body. The body may be rotatably disposed between the second limiting portion and the third limiting portion.

In an embodiment of the invention, the second screw rod includes a connecting shaft, and the connecting shaft has a first end portion. The first end portion penetrates through the third limiting portion and is secured to the body.

In an embodiment of the invention, the hinge structure further includes a passive module. The connecting shaft has a second end portion opposite to the first end portion. The second end portion is inserted in the passive module, and the passive module has a lens.

In an embodiment of the invention, the limiting member further includes a securing portion, and the first limiting portion, the second limiting portion, and the third limiting portion are respectively connected to the securing portion.

In an embodiment of the invention, the limiting member further includes a third guiding portion, and the third guiding portion is connected to the securing portion and is located between the first limiting portion and the second limiting portion.

In an embodiment of the invention, the sliding rod has a sliding slot, and the third guiding portion is coupled to the sliding slot.

In an embodiment of the invention, the first helical slot has a first thread and a second thread connected to the first thread. The first thread is away from the second screw rod, and the second thread is close to the second screw rod.

In an embodiment of the invention, a helical angle of the first thread is greater than a helical angle of the second thread.

In an embodiment of the invention, the helical angle of the first thread is equal to 90 degrees. When the first guiding portion is located in the first thread and the first thread glides relative to the first guiding portion, the sliding rod is at standstill.

In an embodiment of the invention, the helical angle of the second thread is less than 90 degrees. When the first guiding portion moves into the second thread from the first thread and the second thread glides relative to the first guiding portion, the first guiding portion is driven by the second thread to enable the sliding rod to slide.

A portable electronic device is further provided by the embodiments of the invention, and the portable electronic device includes a first machine body, a second machine body and a hinge structure. The first machine body and the second machine body are pivoted to each other through the hinge structure. The first machine body has a first upper surface and a first lower surface opposite to each other. The second machine body has a second upper surface and a second lower surface opposite to each other. The hinge structure includes a passive module. The passive module has a lens. In a first state, the first upper surface and the second upper surface are opposite to each other. When an angle included between the first upper surface and the second upper surface falls between 90 degrees and 150 degrees, the lens is exposed on the first upper surface and the second upper surface. In a second state, the first lower surface and the second lower surface are opposite to each other. When an angle included between the first lower surface and the second lower surface falls between 50 degrees and 90 degrees, the lens is exposed on the first lower surface and the second lower surface.

In an embodiment of the invention, the hinge structure further includes a first screw rod, a sliding rod, and a second screw rod. The first screw rod includes a threaded shaft. The sliding rod is sleeved on the threaded shaft. The second screw rod is sleeved on the sliding rod. The threaded shaft has a first helical slot. The sliding rod has a first guiding portion and a second guiding portion opposite to each other, and the first guiding portion is coupled to the first helical slot. The second screw rod has a second helical slot, and the second guiding portion is coupled to the second helical slot. When the first screw rod rotates along a first rotating direction, the first guiding portion is driven by the first helical slot, such that the sliding rod drives the second helical slot through the second guiding portion, and that the second screw rod rotates along a second rotating direction different from the first rotating direction.

In an embodiment of the invention, the hinge structure further includes a sun gear, an annular gear, and a planetary gear. The annular gear surrounds the sun gear, and the passive module is rotatably connected to the annular gear. The planetary gear is coupled to the sun gear and the annular gear.

In an embodiment of the invention, the hinge structure further includes a first motion member, an elastic member, and a second motion member. The second motion member is located between the first motion member and the elastic member and is rotatably connected to the passive module. The first motion member has a first sawtooth structure. The second motion member has a second sawtooth structure, and the second sawtooth structure is configured to be matched with the first sawtooth structure.

In an embodiment of the invention, the hinge structure further includes a first securing member, a second securing member, and a first connection member. The first securing member is secured to the first machine body, and the second securing member is secured to the second machine body. The first securing member and the second securing member are pivoted to each other. At least one portion of the first securing member is inserted in the first connection member, and at least one portion of the second securing member is inserted in the first connection member.

In an embodiment of the invention, in the portable electronic device, when the second machine body rotates relative to the first machine body, the second securing member and the first connection member rotate along with the second machine body.

In an embodiment of the invention, the hinge structure further includes a third securing member, a fourth securing member, a second connection member, and a third connection member. The third securing member is secured to the first machine body, and the fourth securing member is secured to the second machine body. The third securing member and the fourth securing member are pivoted to each other. At least one portion of the third securing member is inserted in the second connection member, and at least one portion of the fourth securing member is inserted in the second connection member. The third connection member is secured to the first machine body. The passive module is pivoted to the third connection member, and the third connection member is located between the passive module and the second connection member.

In an embodiment of the invention, in the portable electronic device, when the second machine body rotates relative to the first machine body, the fourth securing member and the second connection member rotate along with the second machine body, and the passive module rotates along with the second machine body in a reverse direction.

In an embodiment of the invention, the portable electronic device further includes a first magnetic member and a second magnetic member. The first magnetic member is secured onto the passive module. The second magnetic member is secured onto the second screw rod. The second magnetic member and the first magnetic member are aligned with each other and are attracted to each other.

In an embodiment of the invention, the portable electronic device further includes a third magnetic member secured to the second machine body. The third magnetic member is disposed at a side of the second machine body close to the hinge structure and is disposed corresponding to the first magnetic member.

In an embodiment of the invention, in the portable electronic device, when the passive module rotates relative to the second screw rod such that the first magnetic member moves away from the second magnetic member, the first magnetic member moves close to the third magnetic member, and the third magnetic member and the first magnetic member are repulsive with each other, such that the passive module rotates along a reverse direction.

To sum up, in the hinge structure of the portable electronic device provided by the embodiments of the invention, the first screw rod, the sliding rod, and the second screw rod are disposed in coaxial. As such, the size of the entire structure is effectively reduced, and products adopting the hinge structure are thus can be designed to be thin and lightweight. On the other hand, through the linking relationships among the first screw rod, the sliding rod, and the second screw rod, the first machine body and the second machine body may be easily overturned by 360 degrees, and that the portable electronic device may be operated conveniently by the user.

To make the above features and advantages of the invention more comprehensible, several embodiments accompanied with drawings are described in detail as follows.

DESCRIPTION OF THE EMBODIMENTS

Figure 1:
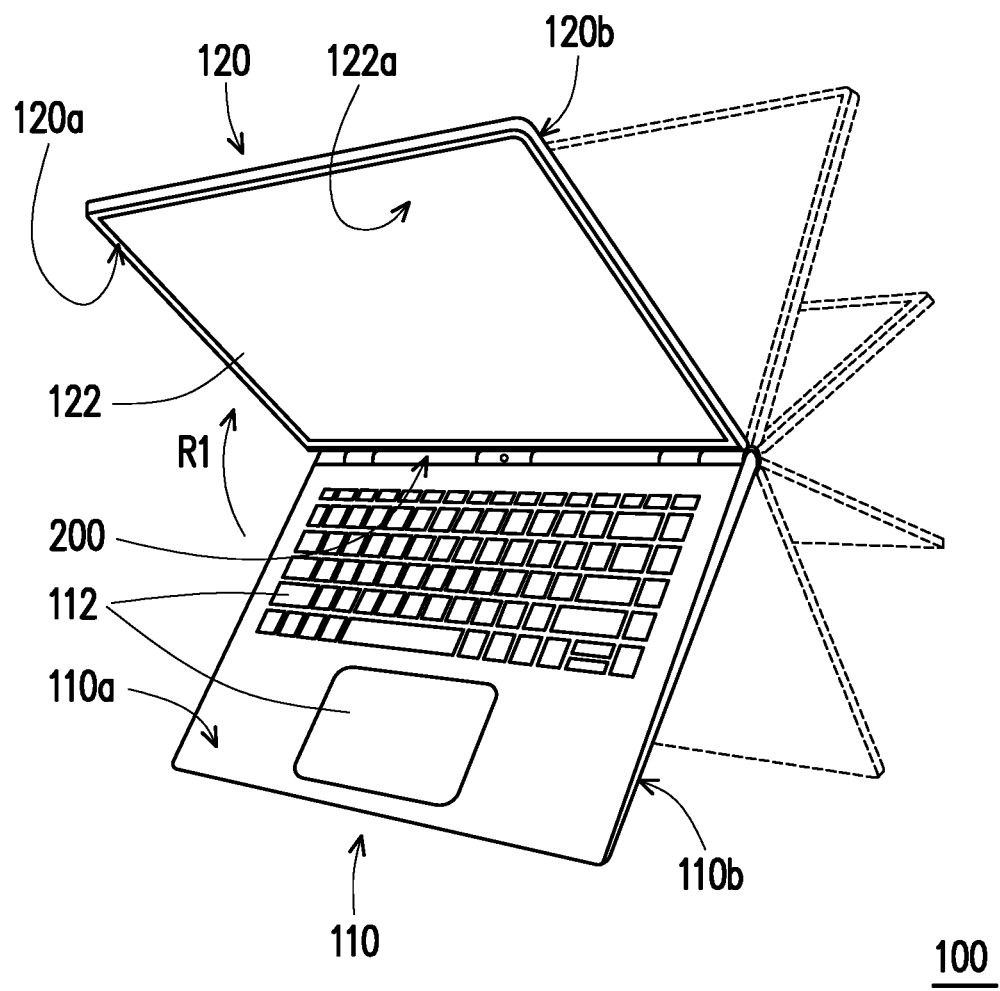
FIG. 1 is a schematic view of a portable electronic device according to an embodiment of the invention.

FIG. 1 is a schematic view of a portable electronic device according to an embodiment of the invention. In order to provide clear illustration and better explanation, a process of a second machine body 120 is overturned relative to a first machine body 110 in a first rotating direction R1 is illustrated with dotted lines in FIG. 1. Referring to FIG. 1, in the present embodiment, a portable electronic device 100 may be a notebook computer or a combination of a tablet computer and a docking station. The invention is not limited thereto. The portable electronic device 100 includes the first machine body 110, the second machine body 120, and a hinge structure 200. The first machine body 110 and the second machine body 120 are pivoted to each other through the hinge structure 200. The hinge structure 200 may allow 360 degrees of rotation. Thereby, the first machine body 110 and the second machine body 120 are able to be overturned by 360 degrees. Generally, the first machine body 110 has an input module 112, and the input module 112 may include a keyboard set and a touch panel. The second machine body 120 has a display module 122, and the display module 122 may have or may not have touch function according to design requirement. On the other hand, the first machine body 110 has a first upper surface 110a and a first lower surface 110b opposite to each other, and the input module 112 is located on the first upper surface 110a. On the other hand, the second machine body 120 has a second upper surface 120a and a second lower surface 120b opposite to each other, and a display surface 122a of the display module 122 is exposed on the second upper surface 120a.

Figure 2:
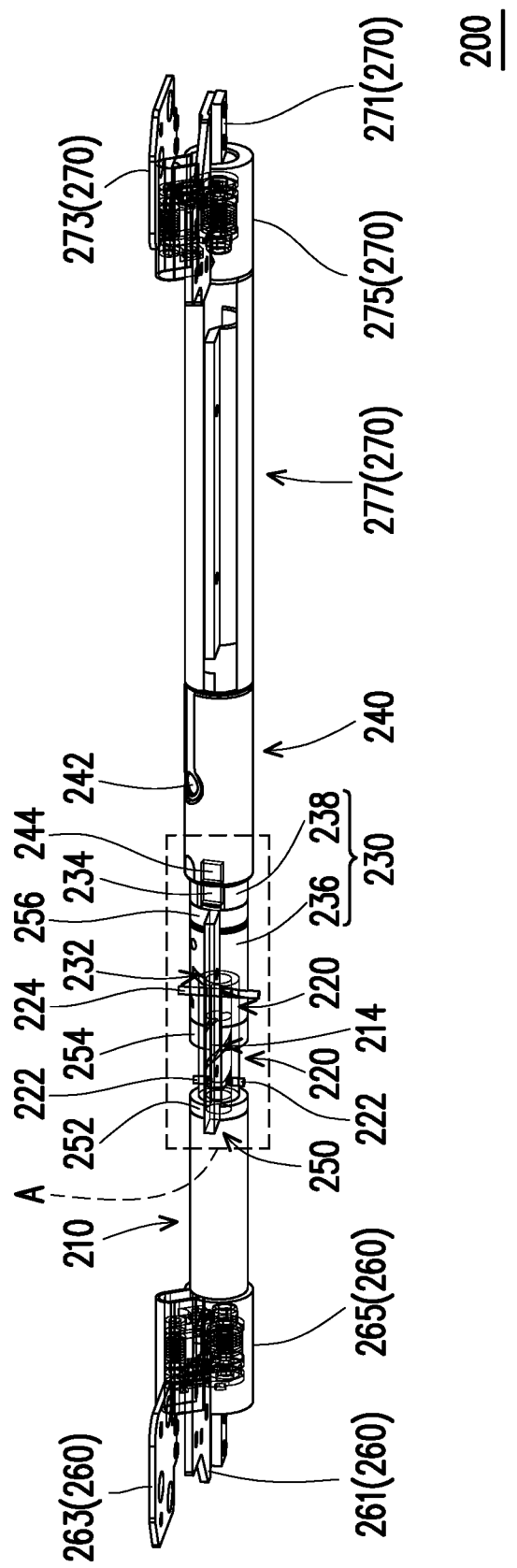
FIG. 2 is a schematic view of the hinge structure in FIG. 1.
Figure 3:
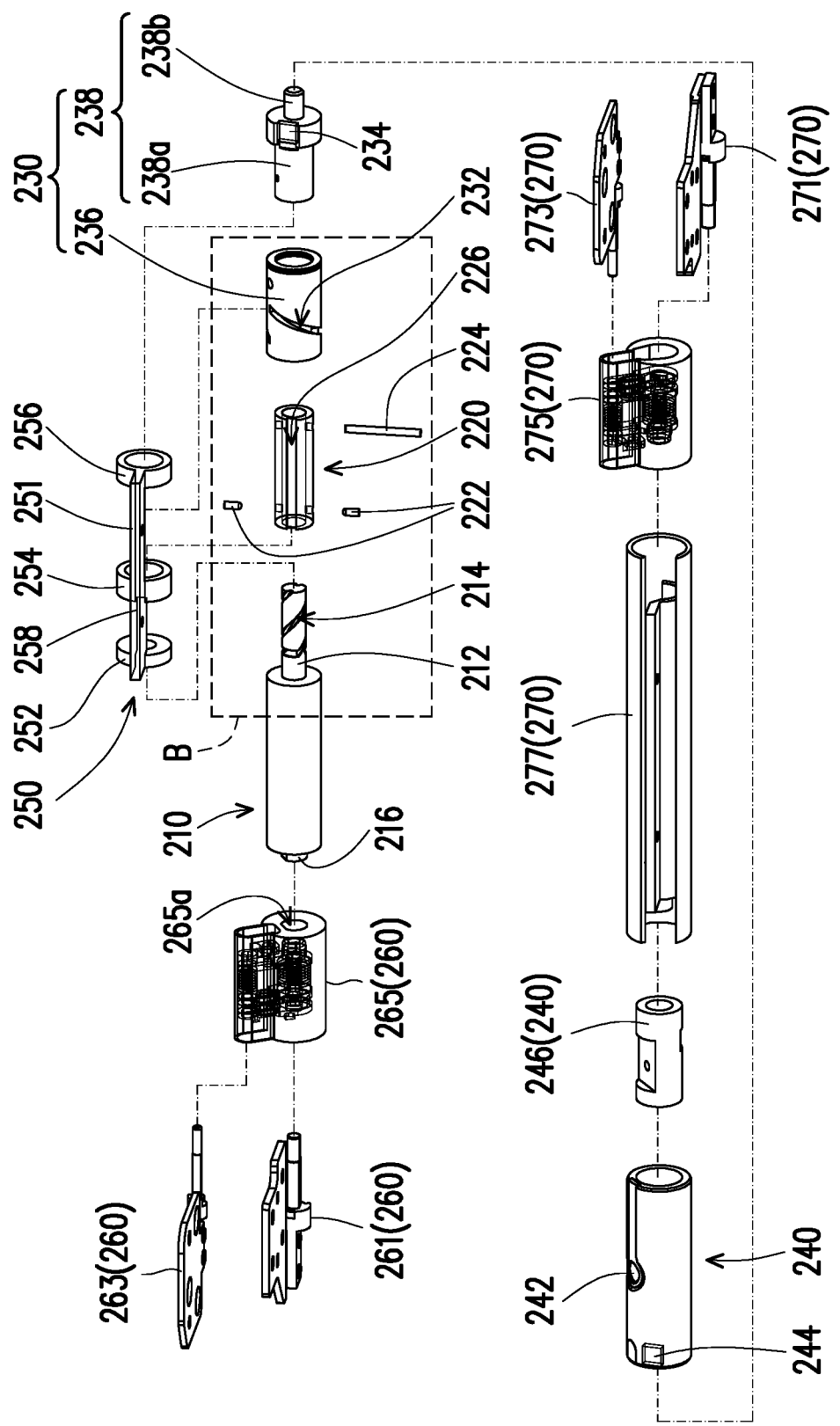
FIG. 3 is a schematic exploded view of the hinge structure in FIG. 2.
Figure 4:
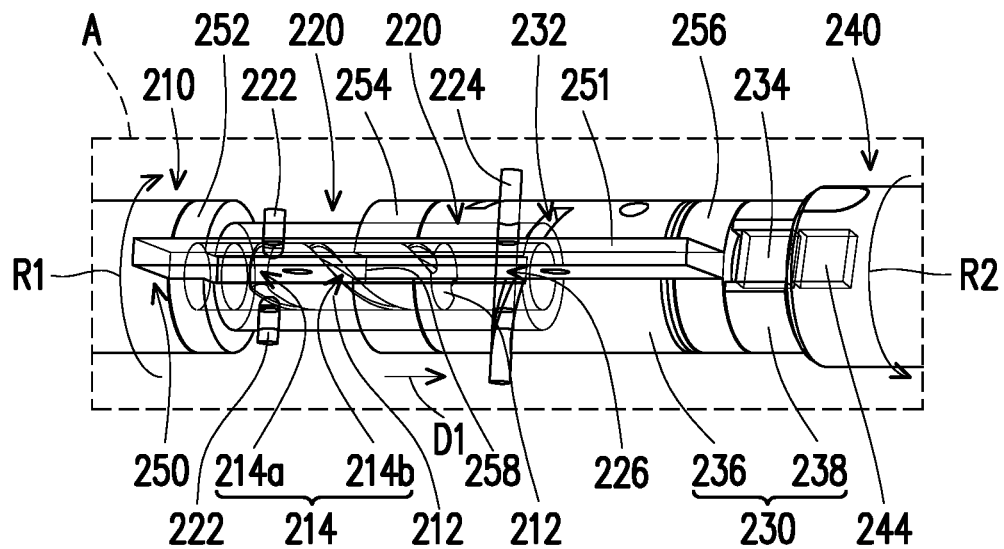
FIG. 4 is a schematic enlarged view of the region A in FIG. 2.
Figure 5:
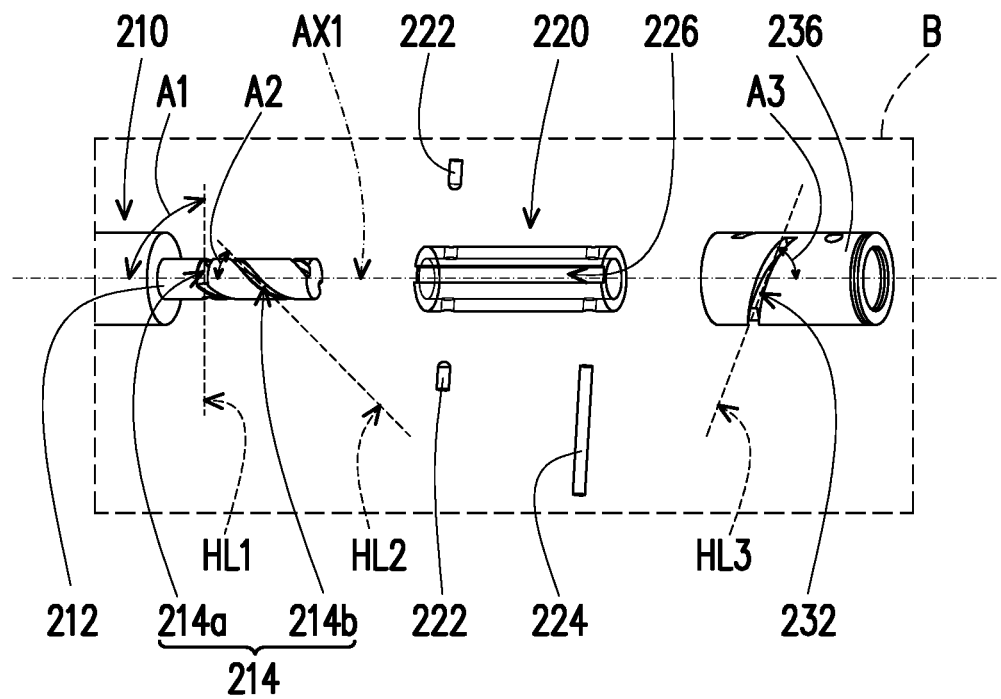
FIG. 5 is a schematic enlarged view of the region B in FIG. 3.

FIG. 2 is a schematic view of the hinge structure in FIG. 1. FIG. 3 is a schematic exploded view of the hinge structure in FIG. 2. FIG. 4 is a schematic enlarged view of the region A in FIG. 2. FIG. 5 is a schematic enlarged view of the region B in FIG. 3. In order to provide clear illustration and better explanation, parts of the components in FIG. 2, FIG. 3, FIG. 4, and FIG. 5 are depicted in a transparent manner. Referring to FIG. 1 to FIG. 5, in the present embodiment, the hinge structure 200 may include a first connection assembly 260 and a second connection assembly 270 opposite to each other. The first connection assembly 260 includes a first securing member 261, a second securing member 263, and a first connection member 265. The second connection assembly 270 includes a third securing member 271, a fourth securing member 273, a second connection member 275, and a third connection member 277.

Specifically, one of the end portions of the first securing member 261 is secured to the first machine body 110, and the other end portion of the first securing member 261 is inserted in the first connection member 265. One of the end portions of the second securing member 263 is secured to the second machine body 120, and the other end portion of the second securing member 263 is inserted in the first connection member 265. The first securing member 261 and the second securing member 263 are pivoted to each other. On the other hand, one of the end portions of the third securing member 271 is secured to the first machine body 110, and the other end portion of the third securing member 271 is inserted in the second connection member 275. One of the end portions of the fourth securing member 273 is secured to the second machine body 120, and the other end portion of the fourth securing member 273 is inserted in the second connection member 275. The third securing member 271 and the fourth securing member 273 are pivoted to each other. Thereby, when the first machine body 110 is at standstill, force may be applied to the second machine body 120, such that the second securing member 263 and the fourth securing member 273 respectively rotate relative to the first securing member 261 and the third securing member 271. At the same time, the first connection member 265 and the second connection member 275 respectively rotate along with the second securing member 263 and the fourth securing member 273, and that the second machine body 120 rotates relative to the first machine body 110. In other words, the second securing member 263, the fourth securing member 273, the first connection member 265, and the second connection member 275 may rotate along with the second machine body 120 in the first rotating direction R1 as shown in FIG. 1. For instance, the first securing member 261 and the second securing member 263 may be pivoted to each other through a segmental torque hinge structure. Similarly, the third securing member 271 and the fourth securing member 273 may be pivoted to each other through another segmental torque hinge structure. Said two segmental torque hinge structures are respectively disposed in the first connection member 265 and the second connection member 275. Furthermore, the two segmental torque hinge structures may be configured to secure an angle at which the second machine body 120 unfolds relative to the first machine body 110.

In the present embodiment, the hinge structure 200 may include a first screw rod 210, a sliding rod 220, and a second screw rod 230. The first screw rod 210, the sliding rod 220, and the second screw rod 230 are respectively disposed between the first connection assembly 260 and the second connection assembly 270. Specifically, the first screw rod 210 is connected to the first connection member 265. The first screw rod 210 comprises a threaded shaft 212, and the sliding rod 220 is sleeved on the threaded shaft 212. In other words, the first connection member 265 and the sliding rod 220 are respectively located at two opposite sides of the first screw rod 210. On the other hand, the second screw rod 230 is sleeved on the sliding rod 220, and the first screw rod 210 and the second screw rod 230 are respectively located at two opposite sides of the sliding rod 220. For instance, the first screw rod 210 may be configured with an engagement shaft 216 opposite to the threaded shaft 212. The first connection member 265 mat be configured with an engagement slot 265a, and the engagement shaft 216 is engaged with and secured to the engagement slot 265a to secure the first screw rod 210 and the first connection member 265. Thereby, when the first connection member 265 rotates along with the second securing member 263, the first screw rod 210 also synchronously rotates along with the first connection member 265.

On the other hand, a circumferential surface of the threaded shaft 212 has at least one first helical slot 214. The sliding rod 220 has a first guiding portion 222 and a second guiding portion 224 opposite to each other, and the first guiding portion 222 is coupled to the first helical slot 214. In the present embodiment, the sliding rod 220 may be a hollow rod member, and the first guiding portion 222 may be a guide pin. The guide pin penetrates through the sliding rod 220 and is sleeved on a portion of the threaded shaft 212 to be coupled to the first helical slot 214. On the other hand, the second screw rod 230 may be a hollow rod member, and the second screw rod 230 has at least one second helical slot 232 penetrating through a circumferential wall. The second guiding portion 224 is coupled to the second helical slot 232. In the present embodiment, the second guiding portion 224 may be a guide pin. The guide pin penetrates through the second helical slot 232 and is secured to a portion of the sliding rod 220 inserted in the second screw rod 230 to be coupled to the second helical slot 232. In other applicable embodiments, the number of the first helical slot and the number of the second helical slot may respectively be plural. Said first helical slots are equidistantly arranged on the circumferential surface of the threaded shaft, and said second helical slots are equidistantly arranged on the circumferential wall of the second screw rod. Relatively, the number of the first guiding portion is corresponding to the number of said first helical slots, and the number of the second guiding portion is corresponding to the number of said second helical slots. Thereby, when the first screw rod rotates, sliding stability of the sliding rod driven by the first screw rod and rotational stability of the second screw rod driven by the sliding rod may both be enhanced significantly.

In the present embodiment, the first helical slot 214 has a first thread 214a and a second thread 214b. The first thread 214a is connected to the second thread 214b, and a helical angle A1 of the first thread 214a is 90 degrees. Thereby, when the first guiding portion 222 is located in the first thread 214a and the first screw rod 210 is turned to rotate along the first rotating direction R1 such that the first thread 214a glides relative to the first guiding portion 222, the sliding rod 220 is not driven by the first screw rod 210, and that the sliding rod 220 is in a standstill state. On the other hand, a helical angle A2 of the second thread 214b is less than 90 degrees, and the helical angle A2, for example, falls between 45 degrees and 65 degrees. Thereby, when the first guiding portion 222 is moved into the second thread 214b from the first thread 214a and the first screw rod 210 is turned to rotate along the first rotating direction R1 such that the second thread 214b glides relative to the first guiding portion 222, the first guiding portion 222 is driven by the second thread 214b of the first helical slot 214, and that the sliding rod 220 slides along a sliding direction D1.

It is worth noting that the first screw rod 210 and the sliding rod 220 share the same central axis AX1, and the sliding direction D1 of the sliding rod 220 is parallel to the central axis AX1 of the first screw rod 210. The helical angle A1 of the first thread 214a is the angle included between a helical line HL1 of the first thread 214a and the central axis AX1 of the first screw rod 210. The helical angle A2 of the second thread 214b is the angle included between a helical line HL2 of the second thread 214b and the central axis AX1 of the first screw rod 210. The helical angle A1 of the first thread 214a is greater than the helical angle A2 of the second thread 214b. In other words, in FIG. 5, the helical angle A1 of the first thread 214a is calculated starting from the central axis AX1 of the first screw rod 210 to the helical line HL1 of the first thread 214a in a clockwise direction. The helical angle A2 of the second thread 214b is calculated starting from the central axis AX1 of the first screw rod 210 to the helical line HL2 of the second thread 214b in the clockwise direction. Moreover, an angle included between an extension line of the first thread 214a extending from a random point position and the central axis AX1 is greater than an angle included between an extension line of the second thread 214b extending from a random point position and the central axis AX1.

When the first guiding portion 222 is driven by the second thread 214b, as the hinge structure 200 further includes a limiting member 250 disposed to be configured to limit movement of the sliding rod 220, such that the sliding rod 220 is able to slide relative to the threaded shaft 212 along the sliding direction D1 without rotating. Referring to FIG. 1 to FIG. 5, the limiting member 250 may include a securing portion 251, a first limiting portion 252, a second limiting portion 254, a third limiting portion 256, and a third guiding portion 258. The limiting member 250 is secured to the first machine body 110 through the securing portion 251. The first limiting portion 252, the second limiting portion 254, and the third limiting portion 256 are arranged in a juxtaposed manner. The first limiting portion 252, the second limiting portion 254, and the third limiting portion 256 are respectively connected to the securing portion 251. On the other hand, the second limiting portion 254 is located between the first limiting portion 252 and the third limiting portion 256. The third guiding portion 258 is located between the first limiting portion 252 and the second limiting portion 254 and is connected to the securing portion 251.

In the present embodiment, as the threaded shaft 212 penetrates through the first limiting portion 252, rotational stability of the first screw rod 210 is thereby enhanced through the first limiting portion 252. On the other hand, the sliding rod 220 penetrates through the second limiting portion 254 and may be slidably disposed between the first limiting portion 252 and the third limiting portion 256. Specifically, the sliding rod 220 further includes a sliding slot 226. The sliding slot 226 is coupled to the third guiding portion 258. An extending direction of the sliding slot 226 is parallel to the sliding direction D1, and an extending direction of the third guiding portion 258 and the extending direction of the sliding slot 226 are parallel to each other. In other words, when the first guiding portion 222 is driven by the second thread 214b, as the sliding slot 226 is matched with the third guiding portion 258, such that the sliding rod 220 is able to slide relative to the threaded shaft 212 along the sliding direction D1 without rotating.

Furthermore, two opposite end portions of the sliding rod 220 inserted in the second limiting portion 254 respectively extend towards the first limiting portion 252 and the third limiting portion 256. The end portion extending towards the first limiting portion 252 is abutted against the first limiting portion 252, and the end portion extending towards the third limiting portion 256 is distant from the third limiting portion 256. In the present embodiment, the second screw rod 230 may comprise a body 236 and a connecting shaft 238. The body 236 may be a hollow rod member and may be rotatably disposed between the second limiting portion 254 and the third limiting portion 256. On the other hand, the body 236 is sleeved on the end portion of the sliding rod 220 extending towards the third limiting portion 256, and two opposite end portions of the body 236 are respectively abutted against the second limiting portion 254 and the third limiting portion 256. The connecting shaft 238 has a first end portion 238a and a second end portion 238b opposite to each other. The first end portion 238a penetrates through the third limiting portion 256, and the first end portion 238a further penetrates into the body 236 to be secured onto the body 236. When the sliding rod 220 slides away from the first limiting portion 252 along the sliding direction D1, the second helical slot 232 located on the body 236 is driven by the second guiding portion 224. As the body 236 is limited between the second limiting portion 254 and the third limiting portion 256, and the first end portion 238a is inserted in the third limiting portion 256, as such, the second screw rod 230 is able to rotate relative to the sliding rod 220 without sliding.

Specifically, when the first screw rod 210 rotates along the first rotating direction R1 such that the first guiding portion 222 is moved into the second thread 214b, the sliding rod 220 is driven by the first screw rod 210 to slide away from the first limiting portion 252 along the sliding direction D1. At the same time, the second screw rod 230 is driven by the sliding rod 220 to rotate along the second rotating direction R2 opposite to the first rotating direction R1. As a helical direction of the second helical slot 232 is configured to be opposite to a helical direction of the first helical slot 214, and thereby, when the sliding rod 220 is driven by the first screw rod 210 rotating in the first rotating direction R1, the sliding rod 220 is able to enable the second screw rod 230 to rotate along the second rotating direction R2 opposite to the first rotating direction R1.

In the present embodiment, a helical angle A3 of the second helical slot 232 is less than 90 degrees, and the helical angle A3, for example, falls between 35 degrees and 55 degrees. It is worth noting that the second screw rod 230, the first screw rod 210, and the sliding rod 220 share the same central axis AX1. The helical angle A3 of the second helical slot 232 is the angle included between a helical line HL3 of the second helical slot 232 and the central axis AX1 of the first screw rod 210. The helical angle A1 of the first thread 214a of the first helical slot 214 and the helical angle A2 of the second thread 214b are both greater than the helical angle A3 of the second helical slot 232. In other words, in FIG. 5, the helical angle A3 of the second helical slot 232 is calculated starting from the central axis AX1 of the first screw rod 210 to the helical line HL3 of the second helical slot 232 in a counter-clockwise direction.

For instance, when the helical angle A2 of the second thread 214b falls between 45 degrees and 65 degrees, the helical angle A3 of the second helical slot 232 falls between 35 degrees and 45 degrees, and the helical angle A3 of the second helical slot 232 is less than 45 degrees, i.e., 45<A2<65 and 35<A3<45. When the helical angle A2 of the second thread 214b falls between 45 degrees and 65 degrees, and when the helical angle A2 of the second thread 214b is greater than 45 degrees, the helical angle A3 of the second helical slot 232 falls between 35 degrees and 45 degrees, i.e., 45<A2<65 and 35<A3<45. When the helical angle A2 of the second thread 214b falls between 55 degrees and 65 degrees, and when the helical angle A2 of the second thread 214b is greater than 55 degrees, the helical angle A3 of the second helical slot 232 falls between 35 degrees and 55 degrees, i.e., 55<A2<65 and 35<A3<55. When the helical angle A2 of the second thread 214b falls between 55 degrees and 65 degrees, the helical angle A3 of the second helical slot 232 falls between 35 degrees and 55 degrees, and the helical angle A3 of the second helical slot 232 is less than 55 degrees, i.e., 55<A2<65 and 35<A3<55. Through the foregoing arrangement, the helical angle A1 of the first thread 214a of the first helical slot 214 provided by the present embodiment and the second helical angle A2 of the second thread 214b are both greater than the helical angle A3 of the second helical slot 232.

As shown in FIG. 5, a helical length of the first helical slot 214 is greater than a helical length of the second helical slot 232. In other words, a total length of a threaded path of the first helical slot 214 is greater than a total length of a threaded path of the second helical slot 232.

Referring to FIG. 2 to FIG. 5, the hinge structure 200 further includes a passive module 240 having a lens 242. The second end portion 238b of the connecting shaft 238 of the second screw rod 230 is inserted in the passive module 240, and the second screw rod 230 is located between the first screw rod 210 and the passive module 240. On the other hand, a third connection member 277 may be a hollow rod member. The third connection member 277 is secured to the first machine body 110, and the passive module 240 is pivoted to the third connection member 277 through a pivot axis 246. In the present embodiment, the passive module 240 is located between the second screw rod 230 and the third connection member 277, and two opposite end portions of the passive module 240 are respectively pivoted to the second screw rod 230 and the third connection member 277. In other words, the third connection member 277 is located between the passive module 240 and the second connection member 275. A signal trace or an electricity trace may penetrate through the second connection member 275 and the third connection member 277 and may extend to the position of the passive module 240 to be electrically connected to the passive module 240.

In the present embodiment, the passive module 240 may be magnetically connected to (or magnetically secured to) the second screw rod 230, such that the passive module 240 is able to rotate along with the second screw rod 230 and the connecting shaft 238. On the other hand, force may be applied by a user to the passive module 240 to remove the magnetic connection relationship between the passive module 240 and the second screw rod 230, such that the passive module 240 rotates relative to the second screw rod 230 and the third connection member 277. Particularly, the second screw rod 230 is configured with a second magnetic member 234, and the second magnetic member 234 may be disposed on the connecting shaft 238. The passive module 240 is configured with a first magnetic member 244. For instance, the second magnetic member 234 and the first magnetic member 244 may form a combination of two magnets magnetically attracted to each other or may form a combination of a magnet and a magnetic metal.

Relative locations, connecting relationships, and linking relationships among the first screw rod 210, the sliding rod 220, the second screw rod 230, and the passive module 240 are described above. Corresponding motions generated by the passive module 240 when the second machine body 120 is overturned relative to the first machine body 110 through the hinge structure 200 is described as follows.

Figure 6A:
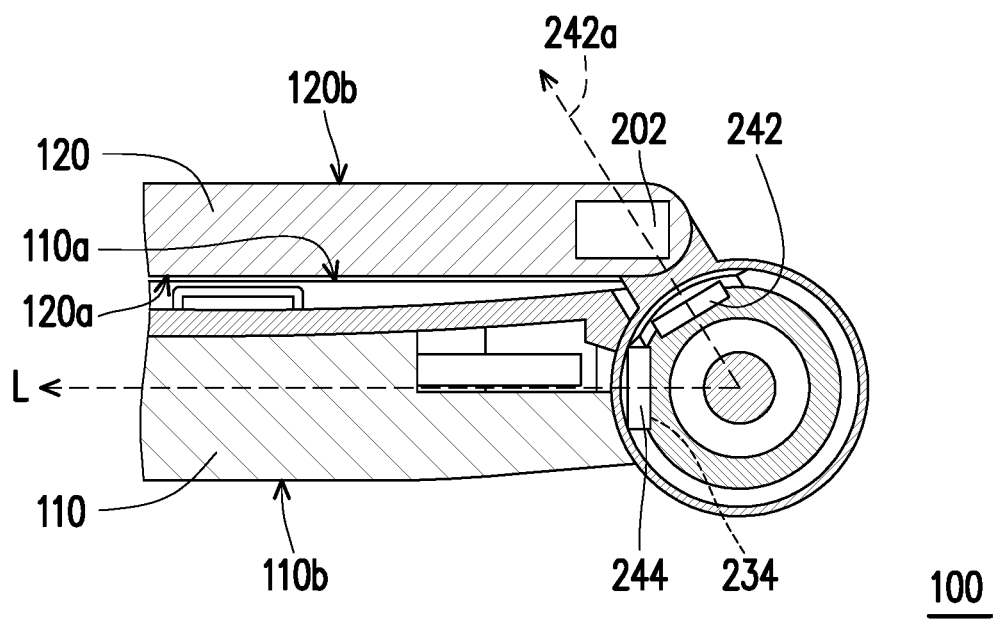
FIG. 6A is a schematic local cross-sectional view of the portable electronic device in FIG. 1, and the portable electronic device is in a closed state.
Figure 6B:
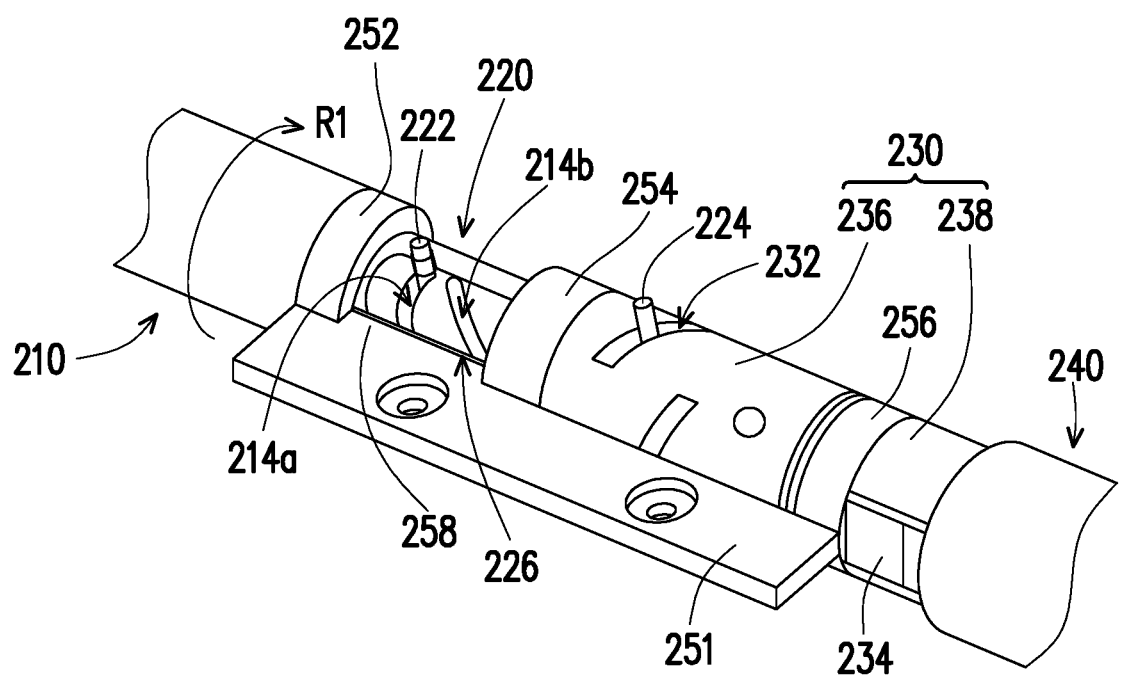
FIG. 6B is a schematic local perspective view corresponding to the hinge structure of the portable electronic device in FIG. 6A.
Figure 7A:
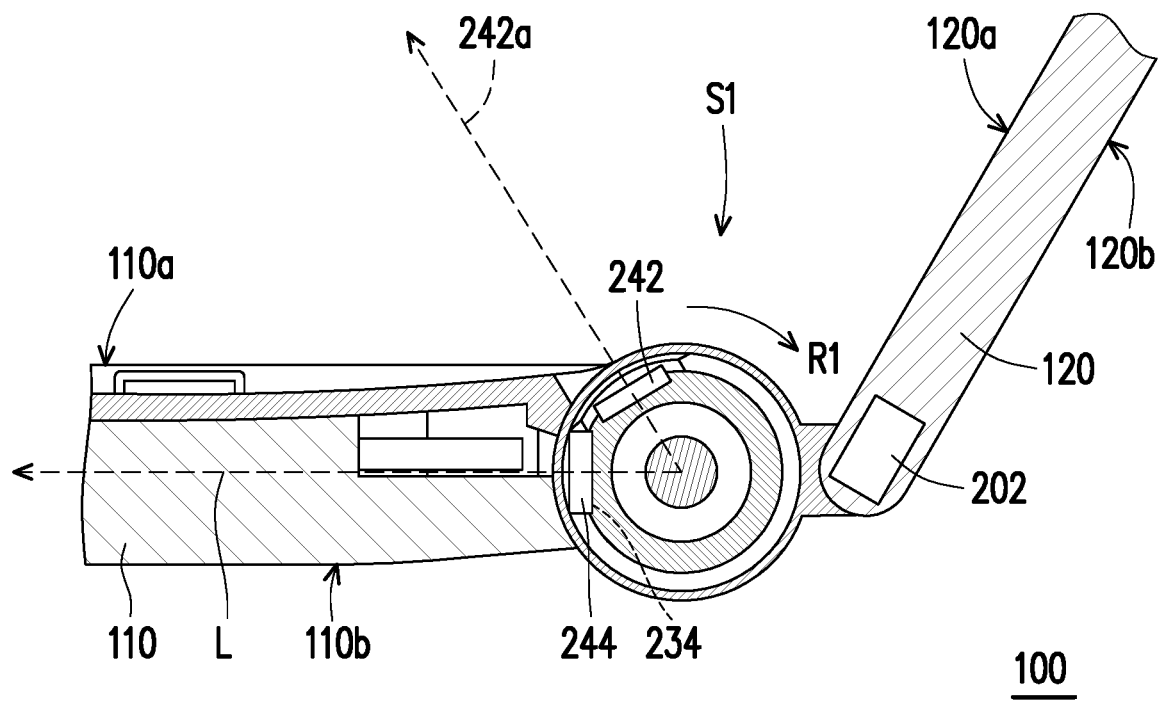
FIG. 7A is a schematic local cross-sectional view of the portable electronic device in FIG. 1, and the portable electronic device is in a first state.
Figure 7B:
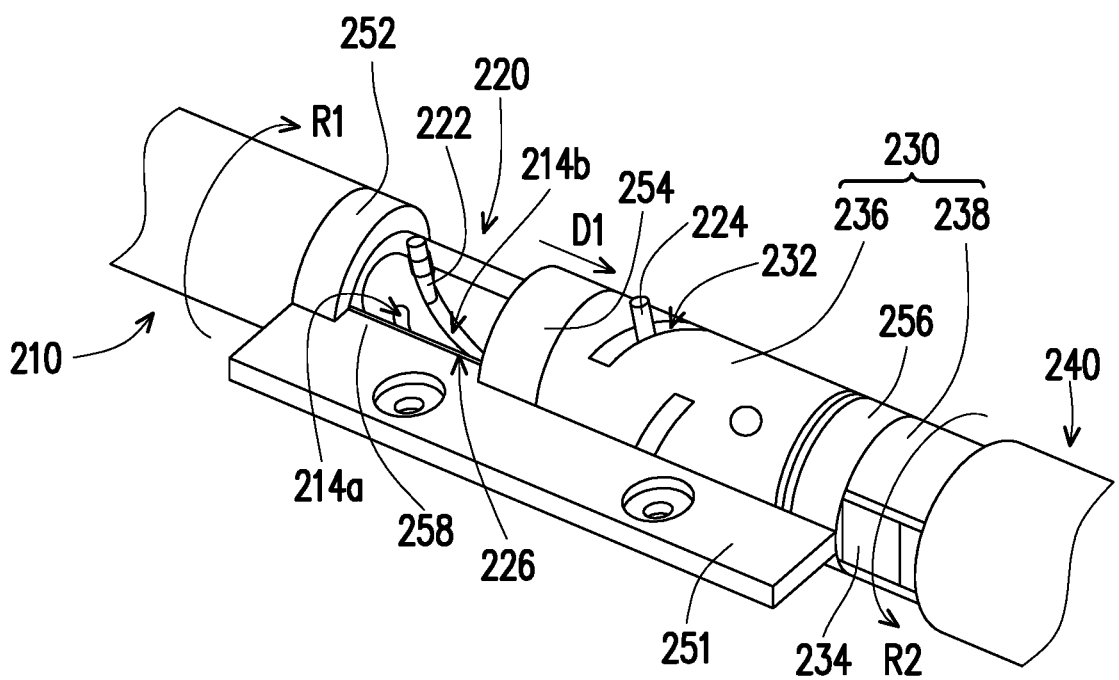
FIG. 7B is a schematic local perspective view corresponding to the hinge structure of the portable electronic device in FIG. 7A.

FIG. 6A is a schematic local cross-sectional view of the portable electronic device in FIG. 1, and the portable electronic device is in a closed state. FIG. 6B is a schematic local perspective view corresponding to the hinge structure of the portable electronic device in FIG. 6A. FIG. 7A is a schematic local cross-sectional view of the portable electronic device in FIG. 1, and the portable electronic device is in a first state. FIG. 7B is a schematic local perspective view corresponding to the hinge structure of the portable electronic device in FIG. 7A. Referring to FIG. 6A and FIG. 6B, before the portable electronic device 100 is transformed to the open state as shown in FIG. 1, the portable electronic device 100 is in the closed state. At this time, the first guiding portion 222 of the sliding rod 220 is located in the first thread 214a. An angle included between a shooting axis 242a of the lens 242 of the passive module 240 and a reference line L parallel to the first upper surface 110a may be 65 degrees.

Referring to FIG. 1, FIG. 2, and FIG. 6A to FIG. 7B, when the first machine body 110 is at standstill and the second machine body 120 is enabled to rotate relative to the first machine body 110 along the first rotating direction R1 to be transformed from the closed state shown in FIG. 6A to the first state shown in FIG. 7A, the first upper surface 110a of the first machine body 110 and the second upper surface 120a of the second machine body 120 are opposite to each other. Moreover, an angle included between the first upper surface 110a and the second upper surface 120a is, for example, 120 degrees. On the other hand, the first screw rod 210 rotates along the first rotating direction R1 such that the first thread 214a glides relative to the first guiding portion 222, as the helical angle A1 of the first thread 214a is 90 degrees, and thereby, the sliding rod 220 does not slide to drive the second screw rod 230 and the passive module 240 to rotate. As such, the angle included between the shooting axis 242a of the lens 242 of the passive module 240 and the reference line L is maintained at 65 degrees. When the first screw rod 210 continues to rotate along the first rotating direction R1, the second thread 214b glides close to the first guiding portion 222, such that the first guiding portion 222 is enabled to move to a juncture between the first thread 214a and the second thread 214b. In the present embodiment, a central angle of the first thread 214a, for example, falls between 115 rad and 125 rad. Thereby, when the portable electronic device 100 is transformed from the closed state shown in FIG. 6A to the first state shown in 7A, the sliding rod 220, the second screw rod 230, and the passive module 240 are maintained to be at standstill. As such, when the portable electronic device 100 is in the first state shown in FIG. 7A, the lens 242 of the passive module 240 in the first state is able to be exposed on an opening space Si defined by the first upper surface 110a and the second upper surface 120a. Moreover, the shooting axis 242a of the lens 242 is set to face the user.

Figure 8A:
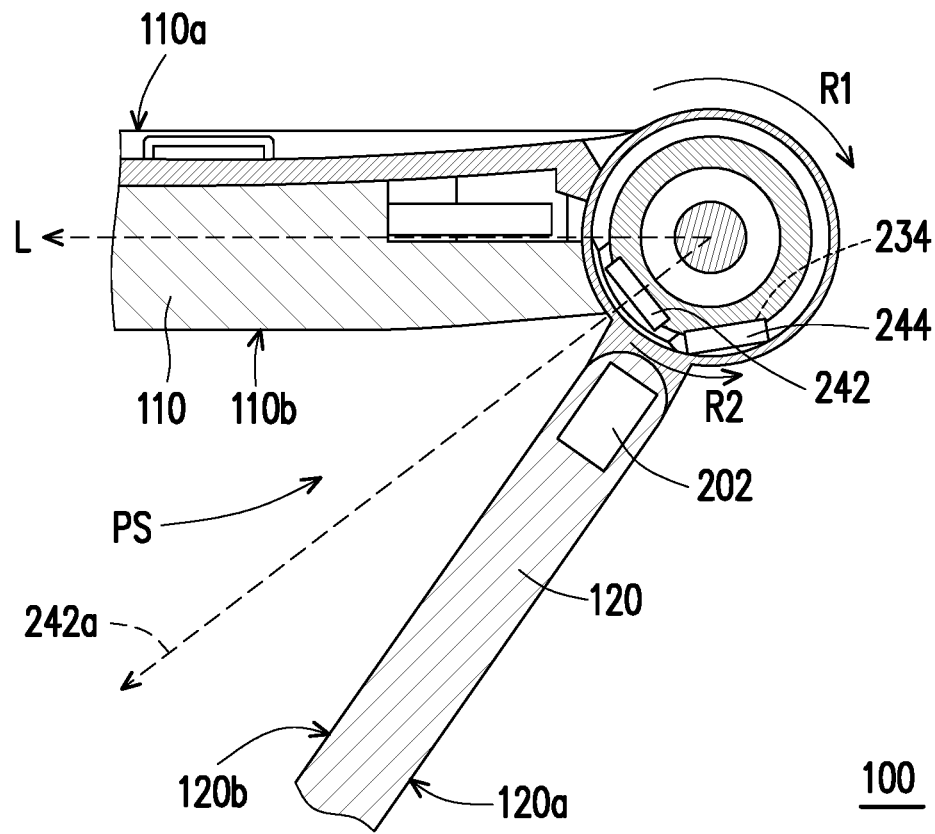
FIG. 8A is a schematic local cross-sectional view of the portable electronic device in FIG. 1, and the portable electronic device is in a second state.
Figure 8B:
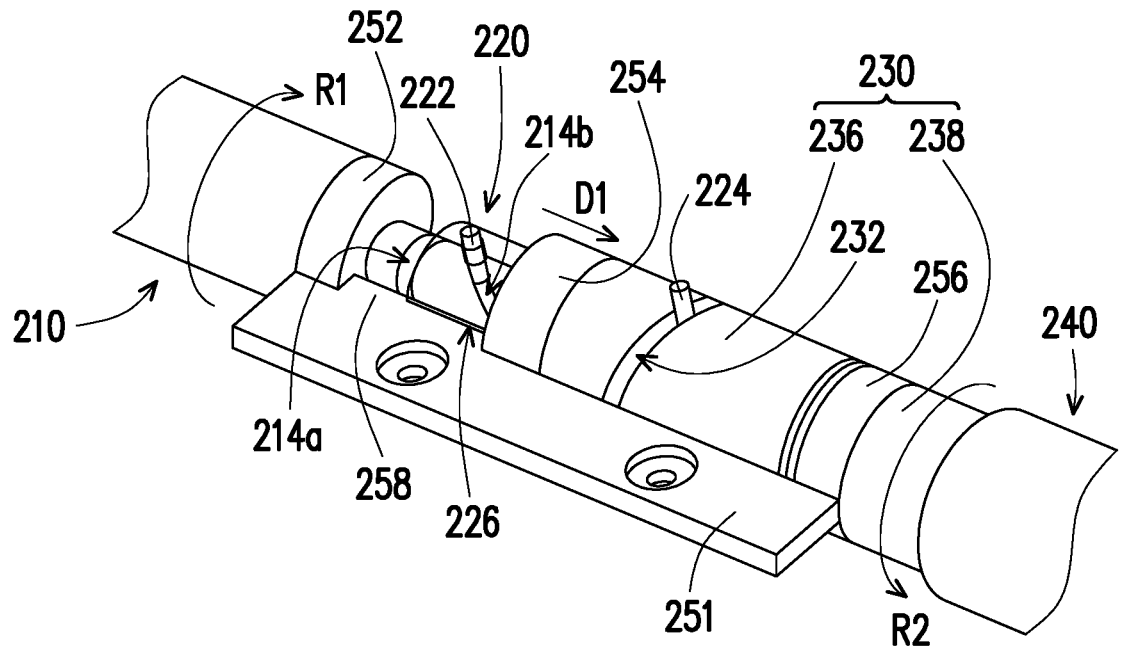
FIG. 8B is a schematic local perspective view corresponding to the hinge structure of the portable electronic device in FIG. 8A.

FIG. 8A is a schematic local cross-sectional view of the portable electronic device in FIG. 1, and the portable electronic device is in a second state. FIG. 8B is a schematic local perspective view corresponding to the hinge structure of the portable electronic device in FIG. 8A. Referring to FIG. 1, FIG. 2, and FIG. 7A to FIG. 8B, the second machine body 120 is enabled to rotate continuously relative to the first machine body 110 along the first rotating direction R1, and the first screw rod 210 rotates along with the second machine body 120 along the first rotating direction R1, such that the first guiding portion 222 is moved into the second thread 214b from the juncture between the first thread 214a and the second thread 214b. As the helical angle A2 of the second thread 214b is less than 90 degrees, and thereby, when the second thread 214b glides relative to the first guiding portion 222, the first guiding portion 222 is driven by the first thread 214b and that the sliding rod 220 slides along the sliding direction D1. At the same time, the second helical slot 232 is driven by the second guiding portion 224 of the sliding rod 220 which is sliding, such that the second screw rod 230 rotates along the second rotating direction R2 different from the first rotating direction R1. As the passive module 240 is magnetically secured to the second screw rod 230, such that the passive module 240 may synchronously rotate along with the second screw rod 230.

When the portable electronic device 100 is transformed from the first state shown in FIG. 7A to the second state shown in FIG. 8A, an angle included between the second upper surface 120a of the second machine body 120 and the first upper surface 110a of the first machine body 110 continues to expand starting from 120 degrees. Moreover, the passive module 240 continues to synchronously rotate along with the second screw rod 230. When the angle included between the second upper surface 120a of the second machine body 120 and the first upper surface 110a of the first machine body 110 is 160 degrees, the passive module 240 rotates by 65 degrees along the second rotating direction R2, and that the angle included between the shooting axis 242a of the lens 242 and the reference line L is changed to 0 degree. When the angle included between the first upper surface 110a and the second upper surface 120a is 180 degrees, the passive module 240 rotates by 73 degrees along the second rotating direction R2, and that the angle included between the shooting axis 242a of the lens 242 and the reference line L is changed to 8 degrees. When the angle included between the first upper surface 110a and the second upper surface 120a is 200 degrees, the passive module 240 rotates by 95 degrees along the second rotating direction R2, and that the angle included between the shooting axis 242a of the lens 242 and the reference line L is changed to 30 degrees. As the first securing member 261 and the second securing member 263 are respectively secured to the first machine body 110 and the second machine body 120, and the first securing member 261 and the second securing member 263 are pivoted to each other through the segmental torque hinge structure, such that when the second machine body 120 rotates relative to the first machine body 110 along the first rotating direction R1, an angle included between the second machine body 120 and the first connection member 265 is maintained at 120 degrees through the segmental torque hinge structure.

Next, the second machine body 120 is enabled to rotate continuously relative to the first machine body 110 along the first rotating direction R1, and the angle included between the first upper surface 110a and the second upper surface 120a thus expands from 200 degrees to 277 degrees. When the angle included between the first upper surface 110a and the second upper surface 120a is 277 degrees, the passive module 240 rotates by 111 degrees in the second rotating direction R2, and that the angle included between the shooting axis 242a of the lens 242 and the reference line L is changed to 46 degrees. When the angle included between the first upper surface 110a and the second upper surface 120a expands from 200 degrees to 277 degrees, the passive module 240 continues to rotate along the second rotating direction R2. Moreover, the second securing member 263 overcomes the torque force of the segmental torque hinge structure, such that an angle included between the second securing member 263 and the first connection member 265 expands from 120 degrees to 199 degrees. At the same time, the angle included between the second machine body 120 and the first connection member 265 expands from 120 degrees to 199 degrees.

When the portable electronic device 100 is in the second state, the first lower surface 110b of the first machine body 110 and the second lower surface 120b of the second machine body 120 are facing opposite to each other. At this time, an angle included between the first lower surface 110b and the second lower surface 120b is 68 degrees to define an image pickup space PS to contain an object 20 to be shot (shown in FIG. 9). Moreover, the lens 242 of the passive module 240 is exposed in the image pickup space PS.

Figure 8C:
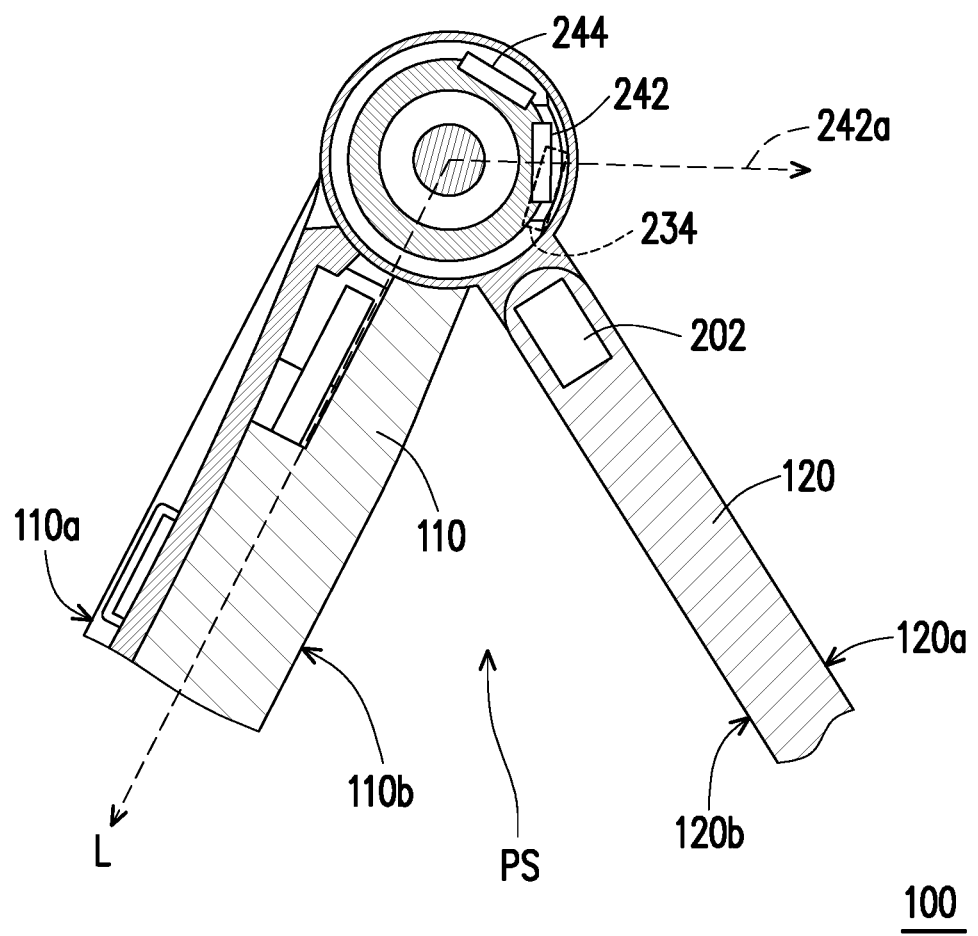
FIG. 8C is a schematic local cross-sectional view of the passive module of the portable electronic device in FIG. 8A is pushed by external force.

FIG. 8C is a schematic local cross-sectional view of the passive module of the portable electronic device in FIG. 8A is pushed by external force. Referring to FIGS. 8A and 8C, in the present embodiment, the portable electronic device 100 further includes a third magnetic member 202. The third magnetic member 202 is secured to the second machine body 120 and is disposed close to a side of the hinge structure 200. Specifically, the third magnetic member 202 is disposed corresponding to the first magnetic member 244, and the first magnetic member 244 and the third magnetic member 202 form a combination of magnets magnetically repulsive to each other. When force is applied by a user to the passive module 240 to remove the magnetic connection relationship between the passive module 240 and the second screw rod 230 (i.e., the magnetic connection relationship between the first magnetic member 244 and the second magnetic member 234), the passive module 240 is able to rotate relative to the second screw rod 230 and the third connection member 277. As such, the lens 242 of the passive module 240 is turned, and the lens 242 is moved out of the image pickup space PS as shown in FIG. 8C.

On the other hand, the repulsive force between the third magnetic member 202 and the first magnetic member 244 is able to drive the passive module 240 to return to the original position, meaning that the first magnetic member 244 and the second magnetic member 234 are aligned with each other, and the passive module 240 is magnetically secured to the second screw rod 230. For instance, when the third magnetic member 202 rotates along with the second machine body 120 and is moved close to the first magnetic member 244, the repulsive force between the third magnetic member 202 and the first magnetic member 244 is able to drive the passive module 240 to rotate. Once the first magnetic member 244 is moved close to the second magnetic member 234, a multiplier effect created by the repulsive force between the first magnetic member 244 and the second magnetic member 234 along with the above-mentioned repulsive force is generated, and that the passive module 240 is enabled to return to the original position more rapidly. On the other hand, when force is applied to the passive module 240 by the user to enable the passive module 240 to rotate, when the first magnetic member 244 on the passive module 240 is moved close to the third magnetic member 202, the repulsive force between the third magnetic member 202 and the first magnetic member 244 is able to drive the passive module 240 to rotate. Once the first magnetic member 244 is moved close to the second magnetic member 234, a multiplier effect created by the repulsive force between the first magnetic member 244 and the second magnetic member 234 along with the above-mentioned repulsive force is generated, and that the passive module 240 is enabled to return to the original position more rapidly.

Figure 9:
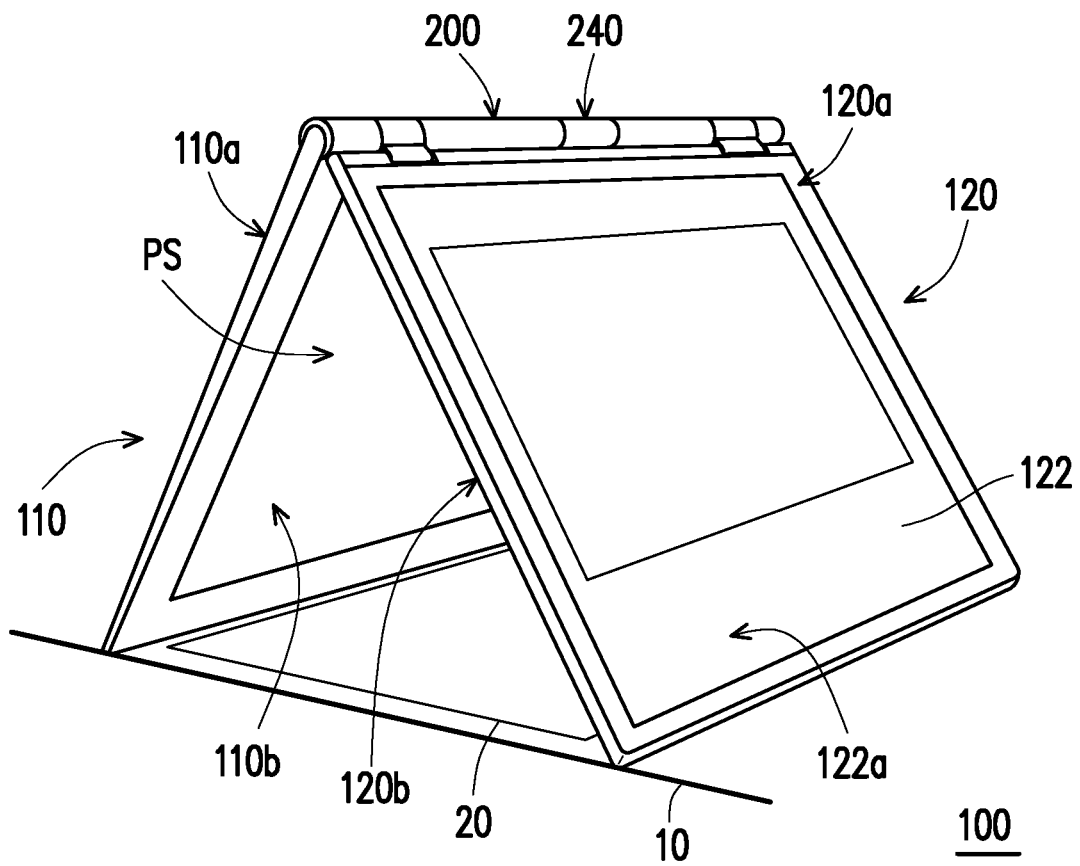
FIG. 9 is a schematic view of the portable electronic device in FIG. 8A shoots an object to be shot through the passive module.
Figure 10:
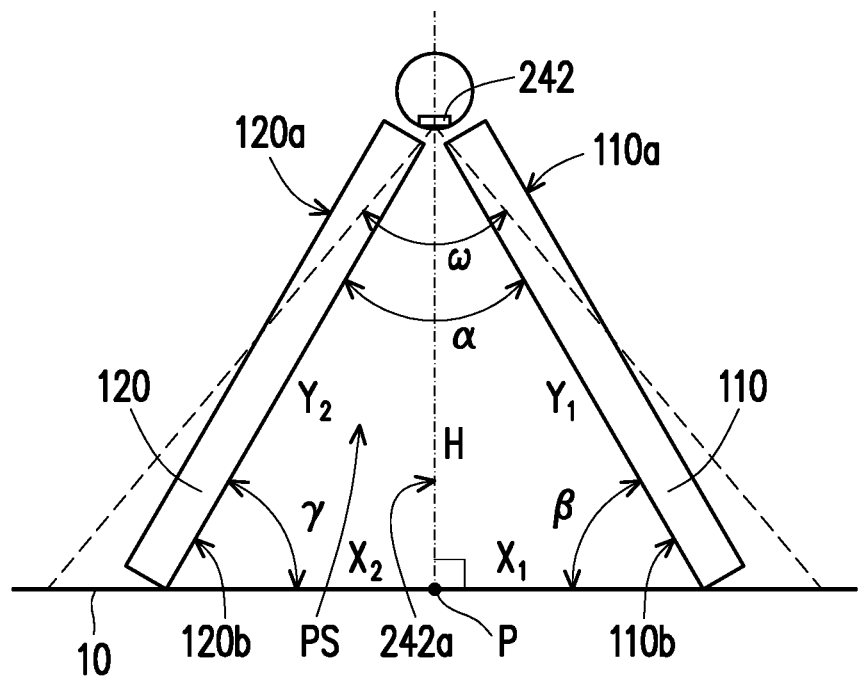
FIG. 10 is diagram showing structural parameters of the portable electronic device in FIG. 8A.

FIG. 9 is a schematic view of the portable electronic device in FIG. 8A shoots an object to be shot through the passive module. FIG. 10 is diagram showing structural parameters of the portable electronic device in FIG. 8A. Referring to FIG. 9 and FIG. 10, the portable electronic device 100 in the second state may be placed on a working platform 10, such that a long lateral side of the first machine body 110 and a long lateral side of the second machine body 120 lean against the working platform 10. At this time, the object 20 to be shot may be placed on the working platform 10 by the user and may be located in the image pickup space PS. Furthermore, the object 20 to be shot is placed between the first lower surface 110b and the second lower surface 120b, and the lens 242 of the passive module 240 faces the object 20 to be shot.

In short, in the hinge structure 200 provided by the present embodiment, the first screw rod 210, the sliding rod 200, and the second screw rod 230 are disposed in coaxial. As such, the size of the entire structure is effectively reduced, and products are able to be designed to be thin and lightweight. On the other hand, when the first machine body 110 and the second machine body 120 are overturned, the passive module 240 magnetically secured to the second screw rod 230 may synchronously rotate along with the second screw rod 230 through the linking relations among the first screw rod 210, the sliding rod 220, and the second screw rod 230. As such, when the portable electronic device 100 is transformed to the second state shown in FIG. 8A, the object 20 to be shot placed between the first lower surface 110b of the first machine body 110 and the second lower surface 120b of the second machine body 120 may be shot through the lens 242 of the passive module 240, and that the portable electronic device 100 may be operated conveniently by the user.

Referring to FIG. 9 and FIG. 10, an included angle between the first lower surface 110b of the first machine body 110 and the second lower surface 120b of the second machine body 120 is $\alpha$, an included angle between the first lower surface 110b of the first machine body 110 and the working platform 10 is $\beta$, an included angle between the second lower surface 120b of the second machine body 120 is $\gamma$, and an image pickup angle of the passive module 240 is $\omega$. For instance, a length of a short lateral side of the first machine body 110 may be $Y_1$, and a length of a short lateral side of the second machine body 120 may be $Y_2$. The shooting axis 242a of the lens 242 of the passive module 240 is, for example, perpendicular to the working platform 10, and a vertical distance between the lens 242 and the working platform 10 is H. On the other hand, the projection point of the shooting axis 242a projected on the working platform 10 is P, a horizontal distance measuring from a point at which the long lateral side of the first machine body 110 leans against the working platform 10 to the projection point 10 is $X_1$, and a horizontal distance measuring from a point at which the long lateral side of the second machine body 120 leans against the working platform 10 to the projection point P is $X_2$.

The following calculation formulas are thus obtained according to trigonometric function: $\sin \beta = H/Y_1$, $\sin \gamma = H/Y_2$, $\cos \beta = X_1/Y_1$, $\cos \gamma = X_2/Y_2$, $X_1 = Y_1 \cos \beta$, $X_2 = Y_2 \cos \gamma$, $H = Y_1 \times \sin \beta$, $H = Y_2 * \times \sin \gamma$, $\beta = \sin^{-1} x(H/Y_1)$, and $\gamma = \sin^{-1} x(H/Y_2)$. On the other hand, the image pickup angle $\omega$ is generally greater than the included angle $\alpha$ and may be presented by the calculation formula as follows: $\omega > 180 - (\beta + \gamma)$. Alternatively, the following calculation formula may also be obtained through converting the foregoing calculation formulas: $\omega > 180 - (\sin^{-1} x(H/Y_1) + \sin^{-1} x(H/Y_2))$. Thereby, an image pickup range of the lens 242 may exceed a sum of the horizontal distance $X_1$ and the horizontal distance $X_2$. Furthermore, the image pickup range of the lens 242 may be converted according to the trigonometric function and through parameters such as the vertical distance H and the image pickup angle ω. A favorable image pickup range refers to a range covering the long lateral side of the first machine body 110 and the long lateral side of the second machine body 120, or a range exceeding the long lateral side of the first machine body 110 and the long lateral side of the second machine body 120. Thereby, the overall object 20 to be shot is located in the image pickup space PS, and a size of the overall object 20 to be shot does not exceed a sum of the long lateral side of the first machine body 110 (or the long lateral side of the second machine body 120) and the sum of the horizontal distance X1 and the horizontal distance X2. As such, the overall object 20 to be shot falls in the range of the image pickup range of the lens 242, and the overall object 20 to be shot can be shot.

For instance, the object 20 to be shot may be an A4 document. When the A4 document is placed, two long lateral sides opposite to each other of the A4 document are required to be placed respectively parallel to the long lateral side of the first machine body 110 and the long lateral side of the second machine body 120. The content of the A4 document may be shot by the passive module 240 through the lens 242, and an image obtained through shooting is displayed on the display surface 122a of the display module 122. As a length of any of the long lateral side of the A4 document is less than or equal to a length of the long lateral side of the first machine body 110 or a length of the long lateral side of the second machine body 120, and thereby, the overall A4 document falls within the image pickup range of the lens 242. In one of the embodiments, the image pickup angle ω of the lens 242 may be greater than or equal to 88 degrees. Moreover, the included angle between the first upper surface 110a of the first machine body 110 and the second upper surface 120a of the second machine body 120 may be 292 degrees, and thus, the corresponding included angle α is 68 degrees. On the other hand, the included angle β may be 54 degrees, the included angle γ may be 58 degrees, and the vertical distance H may be 175 mm. Accordingly, the sum of the horizontal distance X1 and the horizontal distance X2 is converted to be 236 mm. In the rest of the embodiments, the foregoing values may be adjusted according to actual requirements. The invention is not limited thereto.

In the present embodiment, as the image pickup angle ω is greater than the included angle α, such that the image shot by the lens 242 includes portions of the first machine body 110 and the second machine body 120 falling within the image pickup range of the lens 242. If the passive module 240 is set to be in a shooting mode with aspect ratio of 16:9, the image shot by the lens 242 may be cut to cut off unnecessary portions of the image (e.g., the first machine body 110 and the second machine body 120). As such, the complete image of the object 20 to be shot is obtained.

Figure 11:
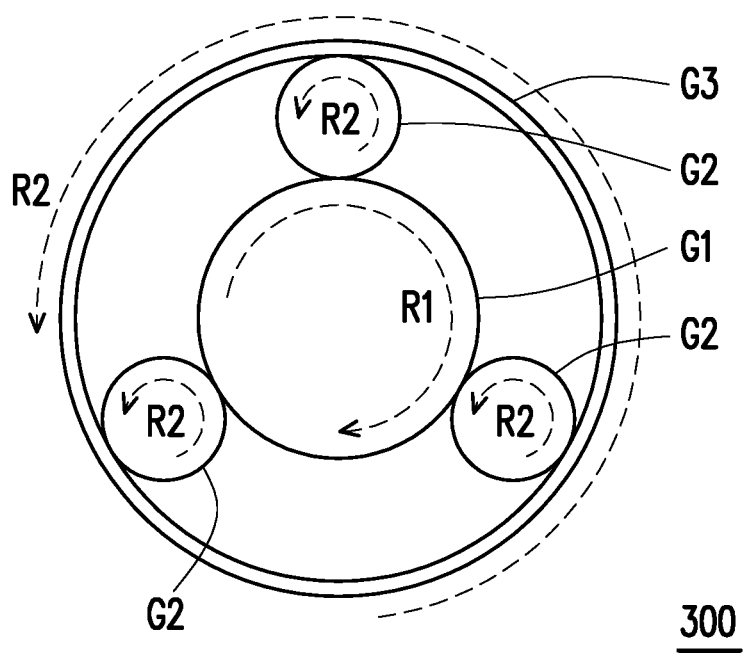
FIG. 11 is a schematic view of a hinge structure according to another embodiment of the invention.
Figure 12A:
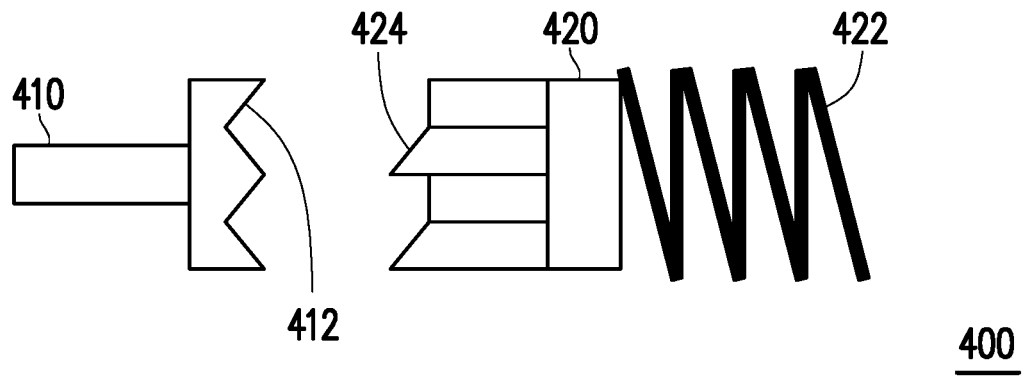
FIG. 12A to FIG. 12D are schematic views of motions of a hinge structure according to still another embodiment of the invention.
Figure 12B:
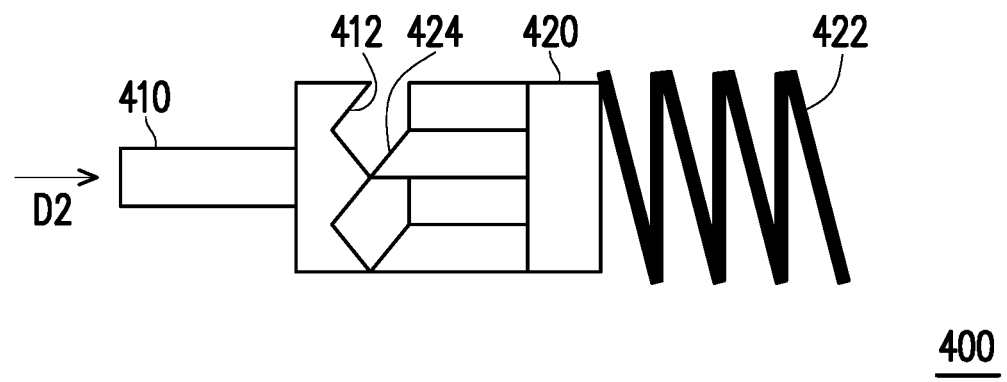
Figure 12C:
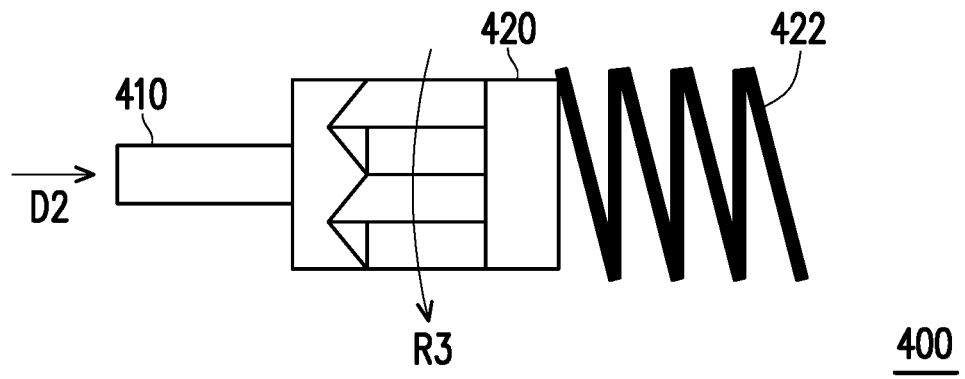
Figure 12D:
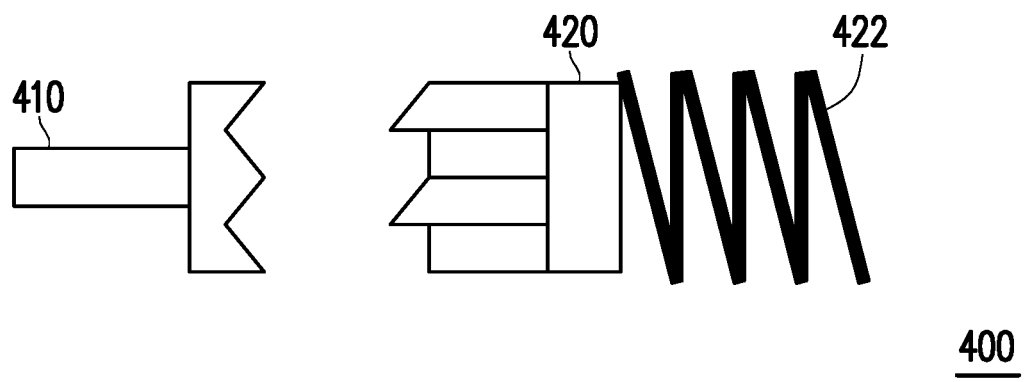

FIG. 11 is a schematic view of a hinge structure according to another embodiment of the invention. Referring to FIG. 11, a hinge structure 300 may be configured to connect the first machine body 110 and the second machine body 120 shown in FIG. 1, such that the first machine body 110 and the second machine body 120 may be overturned by 360 degrees. Specifically, the hinge structure 300 includes a sun gear G1, a plurality of planetary gears G2, and an annular gear G3. The sun gear G1 is coupled to the planetary gears G2, and the planetary gears G2 are coupled to the annular gear G3. When the sun gear G1 rotates along the first rotating direction R1, the planetary gears G2 are driven to rotate along the second rotating direction R2 opposite to the first rotating direction R1. The annular gear G3 is driven by the planetary gears G2 to rotate along the second rotating direction R2. For instance, the passive module 240 in the foregoing embodiments may be rotatably connected to the annular gear G3 to synchronously rotate along with the annular gear G3.

FIG. 12A to FIG. 12D are schematic views of motions of a hinge structure according to still another embodiment of the invention. Referring to FIG. 12A to FIG. 12D, a hinge structure 400 may be configured to connect the first machine body 110 and the second machine body 120 shown in FIG. 1, such that the first machine body 110 and the second machine body 120 may be overturned by 360 degrees. Specifically, the hinge structure 400 includes a first motion member 410 and a second motion member 420. The second motion member 420 is configured with an elastic member 422, and the second motion member 420 is located between the first motion member 410 and the elastic member 422. In the present embodiment, when the second machine body 120 rotates relative to the first machine body 110 as shown in FIG. 1, the first motion member 410 may be driven by the second machine body 120 as shown in FIG. 1 to move close to the second motion member 420 along the sliding direction D2 and is abutted against the second motion member 420. A first sawtooth structure 412 of the first motion member 410 and a second sawtooth structure 424 in the second motion member 420 disposed corresponding to the first sawtooth structure 412 are matched sawtooth structures. The first sawtooth structure 412 may be a combination combining a plurality of inclined surfaces, and the second sawtooth structure 424 may be a combination combining a plurality of flat surfaces and inclined surfaces. Thereby, when the second sawtooth structure 424 is further pushed by the first sawtooth structure, the forced second motion member 420 is able to rotate along a rotating direction R3. For instance, the passive module 240 in the foregoing embodiments may be rotatably connected to the second motion member 420 to synchronously rotate along with the second motion member 420.

On the other hand, when the first motion member 410 moves back and forth along the sliding direction D2 and the opposite direction of the sliding direction D2, the second motion member 420 is continuously pushed by the first motion member 410 to rotate along the rotating direction R3. For instance, the elastic member 422 may be a torsion spring. The torsion spring accumulates elastic potential energy when the second motion member 420 rotates. The second elastic member 420 may rotate along a direction opposite to the rotating direction R3 to return back to the original state when the elastic potential energy is released.

In view of the foregoing, in the hinge structure provided by the embodiments of the invention, the first screw rod, the sliding rod, and the second screw rod are disposed in coaxial. As such, the size of the entire structure is effectively reduced, and products adopting the hinge structure are thus can be designed to be thin and lightweight. On the other hand, when the first machine body and the second machine body are overturned, the passive module magnetically secured to the second screw rod may synchronously rotate along with the second screw rod through the linking relations among the first screw rod, the sliding rod, and the second screw rod. As such, when the portable electronic device is transformed to the second state, the object to be shot placed between the first lower surface of the first machine body and the second lower surface of the second machine body may be shot through the lens of the passive module, and that the portable electronic device may be operated conveniently by the user.

It will be apparent to those skilled in the art that various modifications and variations can be made to the disclosed embodiments without departing from the scope or spirit of the invention. In view of the foregoing, it is intended that the invention covers modifications and variations of this disclosure provided that they fall within the scope of the following claims and their equivalents.

What is claimed is:

1. A portable electronic device, comprising a first machine body, having a first upper surface and a first lower surface opposite to each other; a second machine body, having a second upper surface and a second lower surface opposite to each other; and a hinge structure, comprising a passive module, the passive module having a lens, the first machine body and the second machine body is pivoted to each other through the hinge structure, wherein the first upper surface and the second upper surface are opposite to each other in a first state, and the lens is in the first state and exposed on the first upper surface and the second upper surface when an angle included between the first upper surface and the second upper surface falls between 90 degrees and 150 degrees, wherein the first lower surface and the second lower surface are opposite to each other in a second state, and the lens is in the second state and exposed on the first lower surface and the second lower surface when an angle included between the first lower surface and the second lower surface falls between 50 degrees and 90 degrees; wherein when a user rotates the first machine body or the second machine body from the first state to the second state, the rotation cause the passive module to rotate inside the hinge structure and turn the lens from the first state to the second state.

2. The portable electronic device as claimed in claim 1, wherein the hinge structure further comprises:
a first screw rod, comprising a threaded shaft, the threaded shaft having at least one first helical slot;
a sliding rod, sleeved on the threaded shaft, the sliding rod having a first guiding portion and a second guiding portion opposite to each other, the first guiding portion is coupled to the at least one first helical slot; and
a second screw rod, sleeved on the sliding rod and rotatably connected to the passive module, the second screw rod having at least one second helical slot, the second guiding portion is couple to the at least one second helical slot, when the first screw rod rotates along a first rotating direction, the first guiding portion is driven by the at least one first helical slot, such that the sliding rod drives the at least one second helical slot through the second guiding portion, and that the second screw rod rotates along a second rotating direction different from the first rotating direction.

3. The portable electronic device as claimed in claim 1, wherein the hinge structure further comprises:
a sun gear;
an annular gear, surrounding the sun gear, the passive module is rotatably connected to the annular gear;
a planetary gear, coupled to the sun gear and the annular gear.

4. The portable electronic device as claimed in claim 1, wherein the hinge structure further comprises:
a first motion member, having a first sawtooth structure;
an elastic member; and
a second motion member, located between the first motion member and the elastic member and rotatably connected to the passive module, the second motion member having a second sawtooth structure, the second sawtooth structure is configured to be matched with the first sawtooth structure.

5. The portable electronic device as claimed in claim 1, wherein the hinge structure further comprises:
a first securing member, secured to the first machine body;
a second securing member, secured to the second machine body, the first securing member and the second securing member are pivoted to each other; and
a first connection member, at least one portion of the first securing member is inserted in the first connection member, at least one portion of the second securing member is inserted in the first connection member.

6. The portable electronic device as claimed in claim 5, wherein when the second machine body rotates relative to the first machine body, the second securing member and the first connection member rotate along with the second machine body.

7. The portable electronic device as claimed in claim 1, wherein the hinge structure further comprises:
a third securing member, secured to the first machine body;
a fourth securing member, secured to the second machine body, the third securing member and the fourth securing member are pivoted to each other;
a second connection member, at least one portion of the third securing member is inserted in the second connection member, at least one portion of the fourth securing member is inserted in the second connection member; and
a third connection member, secured to the first machine body, the passive module is pivoted to the third connection member, the third connection member is located between the passive module and the second connection member.

8. The portable electronic device as claimed in claim 7, wherein when the second machine body rotates relative to the first machine body, the fourth securing member and the second connection member rotate along with the second machine body, and the passive module rotates along with the second machine body in a reverse direction.

9. The portable electronic device as claimed in claim 2, further comprising:
a first magnetic member, secured onto the passive module; and
a second magnetic member, secured onto the second screw rod, the second magnetic member and the first magnetic member are aligned with each other and are attracted to each other.

10. The portable electronic device as claimed in claim 9, further comprising:
a third magnetic member, secured to the second machine body, the third magnetic member is disposed at a side of the second machine body close to the hinge structure and is disposed corresponding to the first magnetic member.

11. The portable electronic device as claimed in claim 10, wherein when the passive module rotates relative to the second screw rod such that the first magnetic member moves away from the second magnetic member, the first magnetic member moves close to the third magnetic member, and the third magnetic member and the first magnetic member are repulsive with each other, such that the passive module rotates along a reverse direction.

* * * * *